United States Patent [19]

Grenier et al.

[11] Patent Number: 4,760,451

[45] Date of Patent: Jul. 26, 1988

[54] ELECTRO-OPTICAL SENSOR OF CCD TYPE

[75] Inventors: Gilles Grenier, L'Hay-Les-Roses; Sylvain Berthier, Nemours, both of France

[73] Assignee: Aerospatiale Societe Nationale Industrielle, Paris, France

[21] Appl. No.: 44,770

[22] Filed: May 1, 1987

[30] Foreign Application Priority Data

May 1, 1986 [FR] France .............................. 86 06399

[51] Int. Cl.⁴ .............................................. H04N 3/14
[52] U.S. Cl. .......................... 358/213.13; 358/213.31; 358/213.26
[58] Field of Search .............. 357/24 LR; 358/213.13, 358/213.31, 209, 213.11, 125, 126, 332, 334, 213.26, 44, 293

[56] References Cited

U.S. PATENT DOCUMENTS

| | | | |
|---|---|---|---|
| 3,622,692 | 11/1971 | Stephens, Jr. | 358/44 |
| 4,149,090 | 4/1979 | Agulpek | 250/566 |
| 4,149,091 | 4/1979 | Crean et al. | 250/566 |
| 4,315,284 | 2/1982 | Stillwell et al. | 358/209 |
| 4,321,628 | 3/1982 | Crean | 358/293 |
| 4,404,594 | 9/1983 | Hannan | 358/209 |
| 4,543,491 | 9/1985 | Tateoka et al. | 358/213.13 |
| 4,707,743 | 11/1987 | Tokumitsu et al. | 358/213.13 |
| 4,712,134 | 11/1987 | Murakami | 358/213.13 |

Primary Examiner—Robert Lev
Attorney, Agent, or Firm—Fisher, Christen & Sabol

[57] ABSTRACT

This invention relates to an electro-optical sensor of the CCD type, wherein said optical system is multiple and is capable of forming on said photosensitive zone a plurality of juxtaposed images belonging to different and/or superposed optical fields, and the sequencer controls the simultaneous acquisition by the photosensitive zone of said plurality of images; accumulates said images in said intermediate memory zone, and, via the reading register, controls the transfer of said images from said intermediate memory zone into said outside memory means, as well as the distribution of said images in said outside memory means.

2 Claims, 3 Drawing Sheets

TIMING DIAGRAM

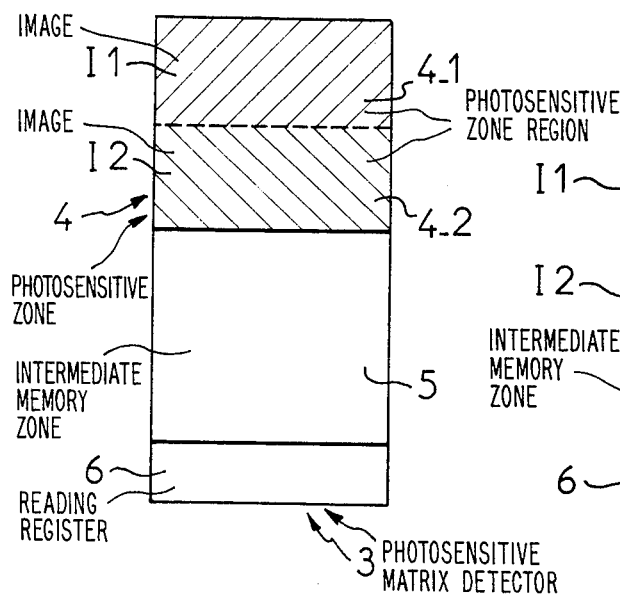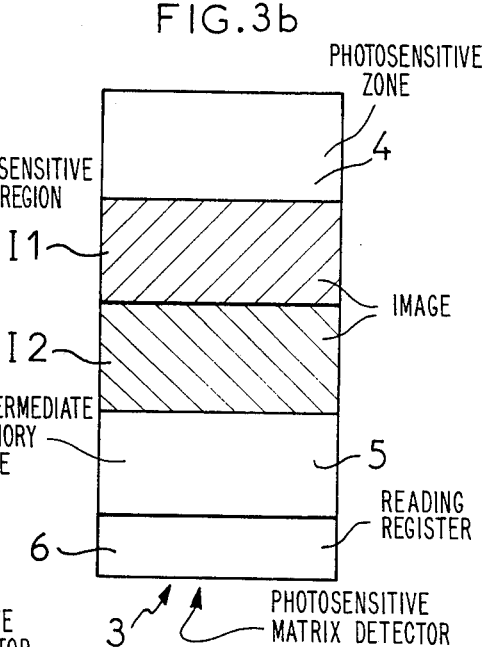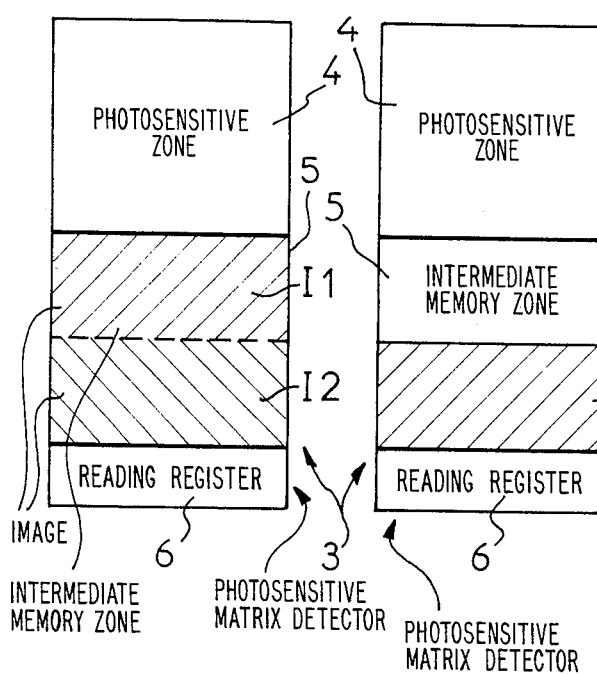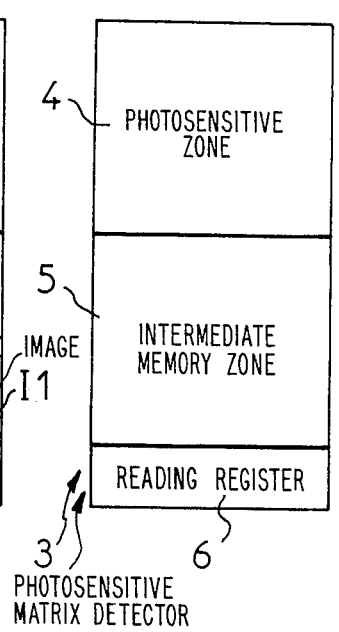

ELECTRO-OPTICAL SENSOR OF CCD TYPE

The present invention relates to an opto-electronic charge coupled device sensor, of the type generally known as CCD sensor.

Opto-electronic sensors of this type are already known, which are constituted by:
an optical system for forming optical images;
a photosensitive CCD matrix detector comprising:
  a photosensitive zone constituted by a plurality of lines of photosensitive elements illuminated by said optical system and forming electrical images by integration of the electrical charges generated by the photons received by said photosensitive elements;
  an intermediate memory zone in which are transferred said images contained in said photosensitive zone; and
  a reading register in which are transferred said images of the intermediate memory zone, said reading register generating a series video signal representative of the optical images received by said photosensitive zone;
memory means outside said matrix detector; and
a sequencer controlling the acquisition of said electrical images by said photosensitive zone and capable of governing the transfers of images between said photosensitive zone and said intermediate memory zone, between said intermediate memory zone and said reading register and between said reading register and said outside memory means.

In these known sensors, each time, a single image is formed on the whole of said photosensitive zone, then transferred in said intermediate memory zone, then read by said reading register, and finally stored in said outside memory means.

In this way, the image taking frequency is limited by the reading time of said sensors; in fact, an image can be taken only after the end of reading of the preceding image.

Now, it would be advantageous, for certain uses of such sensors, to be able to take at least two images simultaneously.

It is the object of the present invention to produce an optical CCD sensor for taking several simultaneous images.

To that end, according to the invention, the optical sensor of the type described hereinabove is noteworthy:
in that said optical system is multiple and is capable of forming on said photosensitive zone a plurality of juxtaposed images belonging to different and/or superposed optical fields; and
in that said sequencer:
  controls the simultaneous acquisition by said photosensitive zone of said plurality of images;
  controls the transfer of said plurality of images thus acquired from said photosensitive zone into said intermediate memory zone, then, via said reading register, the transfer of said plurality of images from said intermediate memory zone into said outside memory means; and
  controls the distribution of said images in said outside memory means.

In this way, the present invention enables an opto-electronic CCD sensor to be produced, capable of taking two or more simultaneous images, the taking of which is followed by a common memorization in said intermediate memory zone, whilst awaiting a deferred reading. The separation of these images is effected during reading by said register, at the moment of memorization in said outside memory means, intended to allow subsequent processing of said images.

Thanks to the invention, it is possible to obtain, with the same detector, two images which are perfectly synchronized, but issing from different optical channels and capable of being processed differently. The applications of such a system are numerous. By way of example, the following may be mentioned:
multi-spectral tracking of a hot body. The same detector being used, it becomes particularly easy to focus fields of identical characteristics outside the spectral band. Two images may thus be formed which are identical but representative of two sub-bands of the reference spectral band of the detector, this making it possible to determine the apparent temperature of the objects observed;
multi-field angular deviation measuring (ADM) of a missile.

The guiding of a missile necessitates it being taken over in an extended field and precise guiding in a narrow field. The use of the device according to the invention makes it possible to avoid the solutions usually employed:
ADM system with two fields focussed on two different detectors;
ADM system with two fields superposed on the same detector and separated by an obturator flap, which do not enable the missile to be tracked in the two fields simultaneously.
ADM of a missile and tracking of a target.

Missile guiding in alignment necessitates simultaneous knowledge of the position of the missile and of the target. The use of the device according to the invention makes it possible to acquire two perfectly synchronized images and to effect a differential target-missile ADM.

In an advantageous embodiment, the opto-electronic sensor according to the present invention comprises an outside processing unit incorporating said outside memory means and generating the parameters of acquisition of said images, parameters that said outside processing unit addresses to said sequencer. These image acquisition parameters are for example the duration of exposure for each image, the synchronization of the taking of images, the synchronization of the reading of the intermediate zone, etc... They may also concern the validation of a particular zone of an image by the sequencer in order to limit the number of image dots to be memorized and processed.

The invention will be more readily understood on reading the following description with reference to the accompanying drawings, in which.

Figure 1:
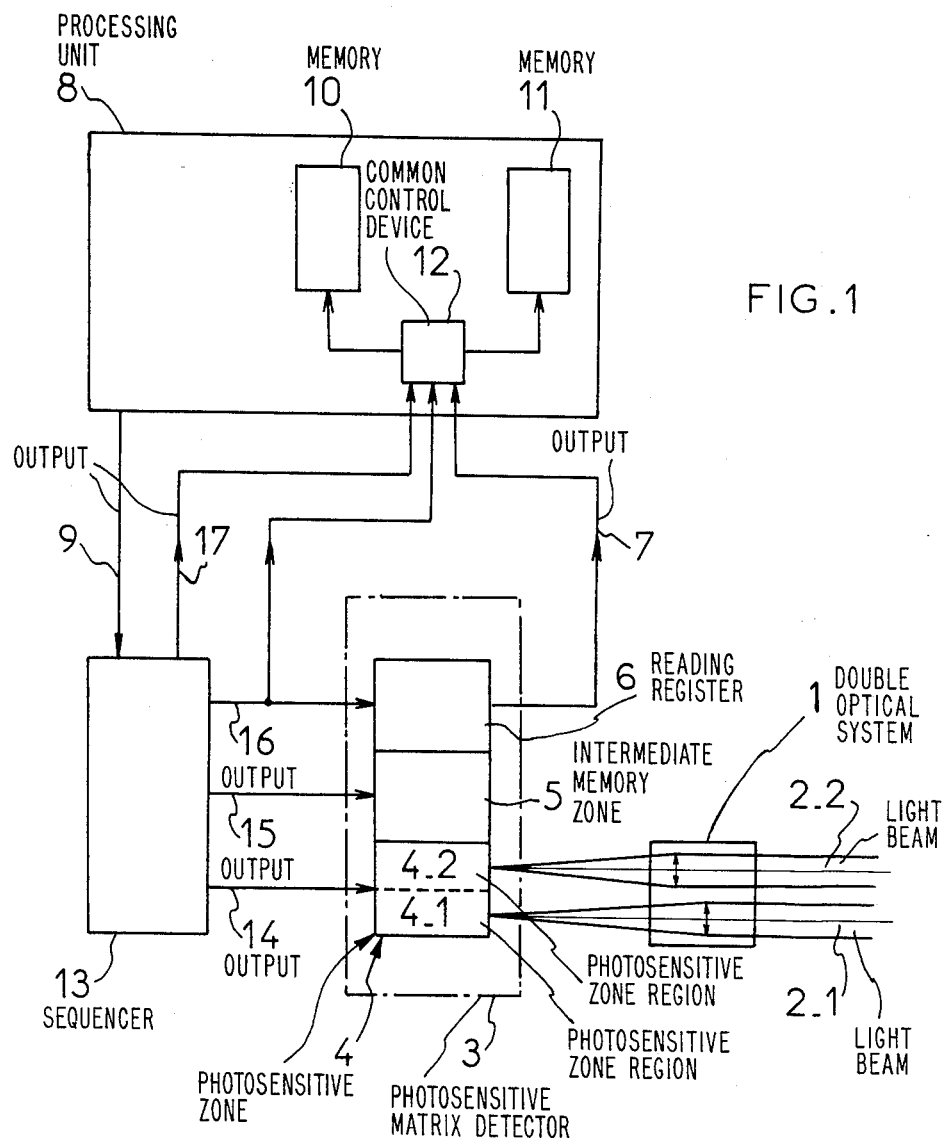
FIG. 1 is the block diagram of an embodiment of the optical CCD sensor according to the invention, for taking two simultaneous images.
Figure 2:
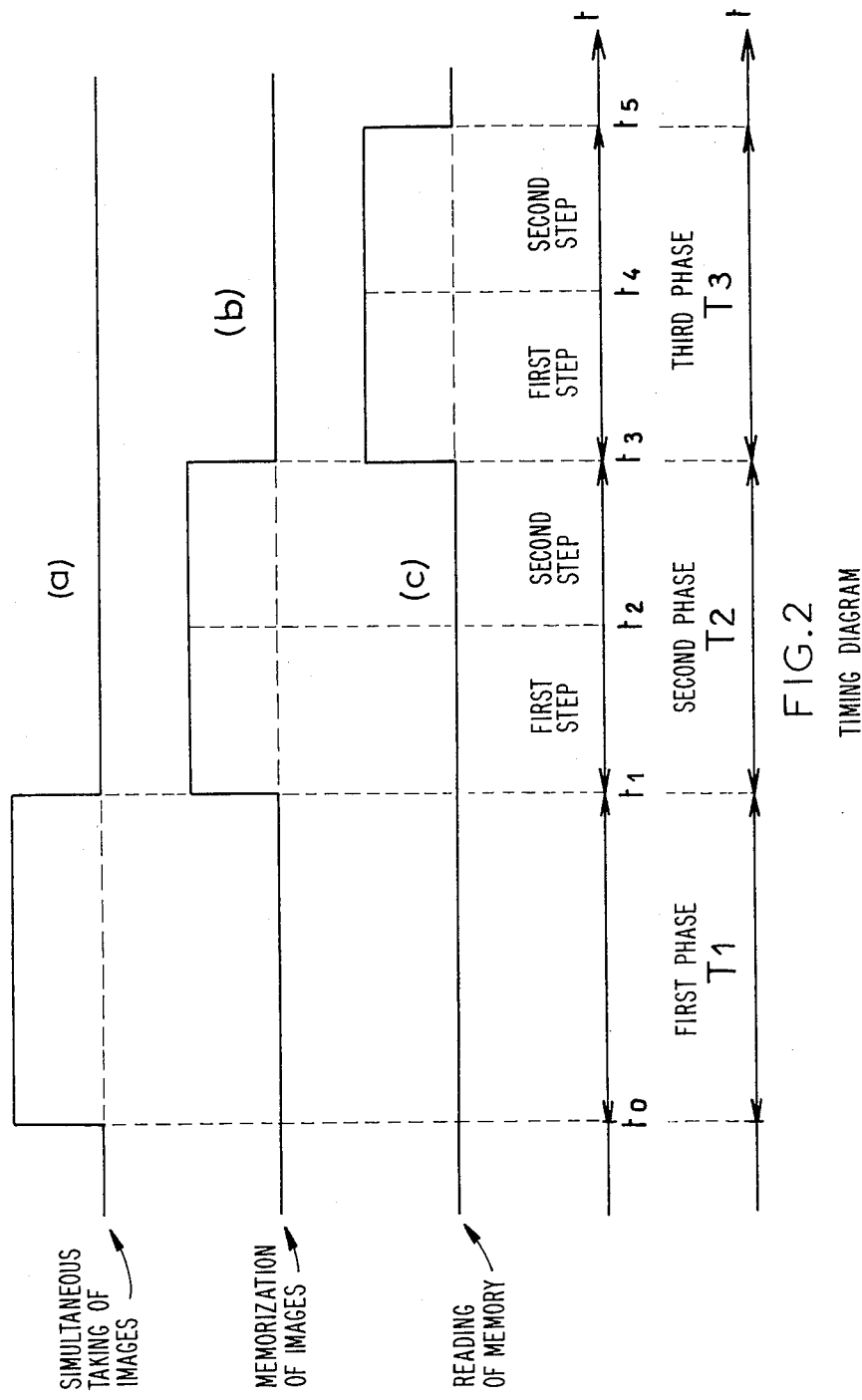
FIG. 2 is a partial schematic timing diagram of the operation of the optical sensor of FIG. 1.

FIGS. 3a to 3e schematically illustrate the state of the CCD matrix detector of the optical sensor of FIG. 1, at several instants of the timing diagram of FIG. 2.

Referring now to the drawings, the optical CCD sensor according to the invention and schematically shown in FIG. 1, is constituted by:
a double optical system 1 receiving two light beams 2.1 and 2.2 coming from two objects (not shown) and capable of forming an optical image of each of said objects. Said objects may be superposed, close to or remote from each other. In the first two cases, the beams 2.1 and 2.2 are at least substantially parallel to each other, whilst in the latter, they are concurrent. The optical system 1 is conventionally constituted by lenses, mirrors, etc. . . .

a photosensitive matrix detector 3 of the CCD type, itself formed by:

a photosensitive zone 4 which is constituted by a plurality of lines of photosensitive elements and which is fictitiously divided into two regions 4.1 and 4.2. On region 4.1, a part of the optical system 1 forms the image I1 of the first object by focussing the beam 2.1. Similarly, on region 4.2, the other part of the optical system 1 forms the image I2 of the second object by focussing the beam 2.2. This photosensitive zone 4 is adapted to integrate the electrical charges generated by the photons of said images to generate image information in electrical form;

an intermediate memory zone 5 which is constituted by a plurality of lines of memory elements and in which are transferred line to line said electrical image information contained in the lines of said photosensitive zone 4; and a reading register 6, in which the electrical image information corresponding to each line of the intermediate memory zone 5 is transferred in parallel, said reading register 6 generating, at its output 7, a video signal representative of the images received from the optical system 1 by the regions 4.1 and 4.2 of the photosensitive zone 4;

a processing unit 8, outside said matrix detector 3 and generating, at its output 9, the parameters defining the acquisition of the images, such as duration of exposure of the images, synchronization of the taking of images, synchronization of the reading, etc. . . ;

two memories 10 and 11 whose access is controlled by a common control device 12. The memories 10 and 11 and device 12 are outside the matrix detector 3 and are advantageously incorporated in the processing unit 8; and a sequencer 13 receiving from the output 9 of the processing unit 8 said image acquisition parameters and charged with controlling the taking of images by the photosensitive regions 4.1 and 4.2 and with governing the transfers of information.

To this end, the sequencer 13 comprises, in particular:

an output 14 on which appears a signal addressed to the photosensitive zone 4 and intended to advance line by line the electrical image information within said photosensitive zone 4 in the direction of the intermediate memory zone 5;

an output 15 on which appears a signal addressed to the intermediate memory zone 5 and intended to advance line by line the electrical image information within said intermediate memory zone 5 in the direction of said reading register 6;

an output 16 on which appears a signal addressed to the reading register 6 and intended to control the latter for it to address to the memories 10 and 11, via its output 7 and the control device 12, a series video signal from the parallel information that it receives from the intermediate memory zone 5. Furthermore, the output 16 is also connected to said control device 12 of said memories 10 and 11; and an output 17 on which appears a validation signal addressed to said control device 12.

Each of the signals appearing at the outputs 14, 15 and 16 of the sequencer 13 is constituted by a series of pulses of constant frequency, each pulse corresponding to a passage from one line to the following (for zones 4 and 5) or to the transformation of a parallel line into a series line (for the reading register 6).

Operation of the sensor according to the invention is explained hereinafter, with the aid of the timing diagram of FIG. 2 and the diagrams of FIGS. 3a to 3e.

This operation comprises three principal phases, referenced T1 to T3 respectively on the timing diagram of FIG. 2.

A Phase T1

This first phase extends from the initial instant t0 to an instant t1 and it corresponds to the simultaneous taking of images I1 and I2. It is more particularly illustrated by diagram (a) of FIG. 2.

At the beginning of this first phase, i.e. at instant t0, it is assumed that the photosensitive zone 4 is entirely empty of the information that it contained beforehand. During this first phase, the sequencer 13 emits signals at its outputs 15 and 16, but does not emit any signal on its output 14. Consequently:

emptying of the intermediate memory zone 5 is under way;

there are formed, respectively on the regions 4.1 and 4.2 of the photosensitive zone 4, images I1 and I2 integrated during the time interval t1–t0 and covering the whole of each of said regions of the photosensitive zone 4.

At the end of this first phase T1, i.e. at instant t1, the intermediate memory zone 5 is completely emptied, whilst the photosensitive zone 4 comprises two juxtaposed images I1 and I2, integrated respectively in regions 4.1 and 4.2. FIG. 3a schematically illustrates the state of the detector 3 at instant t1.

B Phase T2

This second phase extends from instant t1 to a later instant t3 and it corresponds to the memorization of the images I1 and I2 in the intermediate memory zone 5. It is more particularly illustrated by diagram (b) of FIG. 2 and it is subdivided into two consecutive steps, namely:

a first step extending from said instant t1 to a later instant t2 and during which the sequencer 13 emits a signal at its outputs 14 and 15, without emitting on its output 16. Consequently, the lines of region 4.2 of the photosensitive zone 4 corresponding to image I2 are advanced step by step in the direction of the intermediate memory zone 5 and penetrate therein. Image I1 is itself advanced in the direction of the intermediate memory zone 5. Transfer of the lines of image I2 is terminated at instant t2 and the image I1 has then come into position adjacent the intermediate memory zone 5, remaining disposed in the photosensitive zone 4.

FIG. 3 illustrates the state of the detector 3 at that instant t2.

a second step extending from instant t2 to instant t3 at which said phase T2 terminates. During this second step, the sequencer 13 continues to emit a signal at its outputs 14 and 15, but no signal appears on its output 16. Consequently, the lines of the photosensitive zone 4 corresponding to image I1 are transferred in the direction of the intermediate memory zone 5.

Transfer of the image I1 in the direction of the intermediate memory zone 5 is terminated at instant t3. FIG. 3c illustrates the state of the detector 3 at instant t3.

C Phase T3

The third phase T3, more particularly illustrated by diagram (c) of FIG. 2, extends from instant t3 to a later instant t5 and corresponds to the reading of the contents of the intermediate memory zone 5 by the reading register 6. During this phase T3, the sequencer 13 emits signals on its outputs 15 and 16 with the result that said images I1 and I2 are advanced towards the register 6, then transferred into the latter, which addresses then by its output 7, towards memories 10 and 11. Thanks to the link between the output 16 of the sequencer 13 and the control device 12, the video signal at said output 7 of the reading register 6 is sampled and synchronized by the reading signal appearing at the output 16. Furthermore, the validation signal, emitted by the sequencer 13 on its output 17 and addressed to the control device 12, allows the separation of the two images I1 and I2, with the result that one, for example I1, may be stored in the memory 10, whilst the other, for example I2, may be stored in memory 11.

This third phase T3 is subdivided into two steps extending respectively from instant t3 to an instant t4, and from this instant t4 to instant t5.

The first step corresponds to the reading of image I2, which is terminated at instant t4. As illustrated schematically in FIG. 3d, the image I1 has then come into a position adjacent register 6.

During the second step, the register 6 reads the image I1 and, at instant t5, such a reading is terminated (cf. FIG. 3e).

At the end of phase T3, i.e. at instant t5, memorization of the partial images I1 and I2 is therefore terminated.

Images I1 and I2 are then memorized in memories 10 and 11 whilst awaiting subsequent exploitation.

Thanks to the invention, an optical sensor is thus produced, which enables two simultaneous images to be made. Operation of the sensor may, of course, be cyclic, with taking and storage of two images at each cycle.

What is claimed is:

1. An opto-electronic CCD sensor, comprising:
an optical system for forming optical images;
a photosensitive CCD matrix detector comprising:
   a photosensitive zone constituted by a plurality of lines of photosensitive elements illuminated by said optical system and forming electrical images by integration of the electrical charges generated by the photons received by said photosensitive elements;
   an intermediate memory zone in which are transferred said images contained in said photosensitive zone; and
   a reading register in which are transferred said images of the intermediate memory zone, said reading register generating a series video signal representative of the optical images received by said photosensitive zone;
memory means outside said matrix detector; and
a sequencer controlling the acquisition of said electrical images by said photosensitive zone and capable of governing the transfers of images between said photosensitive zone and said intermediate memory zone, between said intermediate memory zone and said reading register and between said reading register and said outside memory means,
wherein:
said optical system is multiple and is capable of forming on said photosensitive zone a plurality of juxtaposed images belonging to different and/or superposed optical fields; and
said sequencer:
   controls the simultaneous acquisition by said photosensitive zone of said plurality of images;
   controls the transfer of said plurality of images thus acquired from said photosensitive zone into said intermediate memory zone, then, via said reading register, the transfer of said plurality of images from said intermediate memory zone into said outside memory means; and
   controls the distribution of said images in said outside memory means.

2. The opto-electronic CCD sensor of claim 1, wherein it comprises an outside processing unit incorporating said outside memory means and generating the parameters of acquisition of said images, parameters that said outside processing unit addresses to said sequencer.

* * * * *